US012610250B2

(12) United States Patent
Zhu et al.

(10) Patent No.: US 12,610,250 B2
(45) Date of Patent: Apr. 21, 2026

(54) NETWORK COVERAGE PREDICTION METHOD AND DEVICE, AND COMPUTER READABLE STORAGE MEDIUM

(71) Applicant: ZTE CORPORATION, Shenzhen (CN)

(72) Inventors: Yongjun Zhu, Shenzhen (CN); Baoshu Zhang, Shenzhen (CN); Pei Lin, Shenzhen (CN); Shijun Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 309 days.

(21) Appl. No.: 18/549,423

(22) PCT Filed: Dec. 15, 2021

(86) PCT No.: PCT/CN2021/138456
§ 371 (c)(1),
(2) Date: Sep. 7, 2023

(87) PCT Pub. No.: WO2022/193757
PCT Pub. Date: Sep. 22, 2022

(65) Prior Publication Data
US 2024/0155367 A1 May 9, 2024

(30) Foreign Application Priority Data
Mar. 17, 2021 (CN) .......................... 202110287416.6

(51) Int. Cl.
*H04W 16/18* (2009.01)
(52) U.S. Cl.
CPC .................................. *H04W 16/18* (2013.01)
(58) Field of Classification Search
CPC ..... H04W 16/18; H04W 16/22; H04W 24/06; H04W 24/08; H04W 24/02; H04W 24/10;
(Continued)

(56) References Cited

U.S. PATENT DOCUMENTS 9,730,080 B2 * 8/2017 Wang .................... H04W 16/18
11,259,191 B2 * 2/2022 Chen .................... H04W 16/18
(Continued)

FOREIGN PATENT DOCUMENTS

CN 101060689 A 10/2007
CN 103052081 A * 4/2013 ............ H04W 16/18
(Continued)

OTHER PUBLICATIONS

Chen, Y., et al. "Forecast Coverage of WCDMA by GSM Drive Test Data," Telecom Engineering Technics and Standardization, No. 11, Nov. 2007.
(Continued)

*Primary Examiner* — Matthew C Sams
(74) *Attorney, Agent, or Firm* — Vivacqua Crane, PLLC

(57) ABSTRACT

Disclosed are a network coverage prediction method and device, and a non-transitory computer readable storage medium. The network coverage prediction method may include: acquiring Measure Report (MR) data of a first network, first characteristic information corresponding to the first network, and second characteristic information corresponding to a second network, where the first network and the second network have a same coverage area, and are reusable and co-sited; determining a first coverage strength of the first network in the coverage area according to the MR data; determining a coverage strength difference between the first network and the second network in the coverage area according to the first characteristic information and the second characteristic information; and determining a predicted coverage strength of the second network in the coverage area according to the first coverage strength and the coverage strength difference.

8 Claims, 7 Drawing Sheets

(58) Field of Classification Search

CPC ..... H04W 16/00; H04W 16/26; H04W 16/32; H04W 52/04; H04W 64/00; H04W 84/047; H04W 88/10; G06N 3/02; G06N 3/045; G06N 3/08; H04B 17/318; H04B 17/336; H04B 17/3913; H04B 7/0413; H04B 7/0617; H04B 7/15507; H04B 7/15528; H04B 7/15535; H04B 7/1555; H04B 7/15578; H04B 7/2606

See application file for complete search history.

(56) References Cited

U.S. PATENT DOCUMENTS

| | | | | |
|---|---|---|---|---|
| 11,277,499 | B2 * | 3/2022 | Reynolds | ............ H04L 12/4625 |
| 2006/0240834 | A1 * | 10/2006 | Sawaya | ................. H04W 16/18 |
| | | | | 455/446 |
| 2010/0305931 | A1 * | 12/2010 | Fordham | ............... H04W 16/18 |
| | | | | 703/13 |
| 2015/0350923 | A1 * | 12/2015 | Wang | .................... H04W 16/18 |
| | | | | 370/254 |

FOREIGN PATENT DOCUMENTS

| | | | | | |
|---|---|---|---|---|---|
| CN | 103533554 | A | * | 1/2014 | |
| CN | 106712996 | A | | 5/2017 | |
| CN | 104333893 | B | * | 10/2018 | ............ H04W 52/04 |
| CN | 111050346 | A | | 4/2020 | |
| CN | 111385038 | A | | 7/2020 | |
| CN | 111818550 | A | * | 10/2020 | ............ H04W 64/00 |
| CN | 112469066 | A | | 3/2021 | |
| CN | 113055925 | A | * | 6/2021 | ............ H04W 24/08 |
| CN | 114339860 | A | * | 4/2022 | |
| CN | 113055925 | B | * | 12/2022 | ............ H04W 24/08 |
| CN | 120302320 | A | * | 7/2025 | |
| EP | 4294069 | A1 | * | 12/2023 | ............ H04W 24/02 |
| WO | WO-2011119767 | A1 | * | 9/2011 | ............ H04W 16/26 |

OTHER PUBLICATIONS

International Searching Authority. International Search Report and Written Opinion for PCT Application No. PCT/CN2021/138456 and English translation, mailed Mar. 17, 2022, pp. 1-15.

Zhang, C., et al. Planning Research Based on the Evolution of TD-SCDMA Network to TD-LTE, Communication & Information Technology, No. 6, Nov. 2014.

* cited by examiner

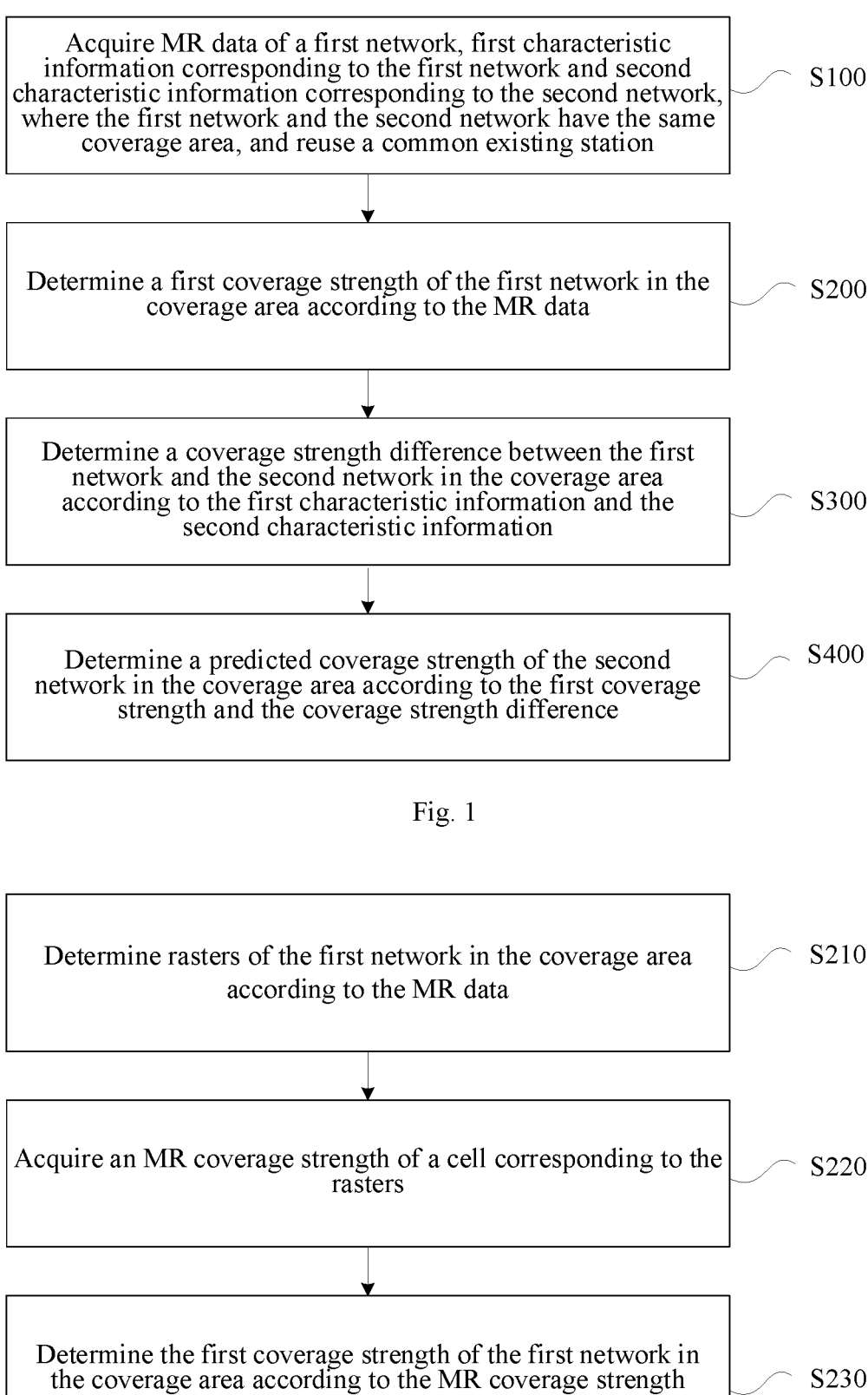

Acquire MR data of a first network, first characteristic
information corresponding to the first network and second
characteristic information corresponding to the second network,
where the first network and the second network have the same
coverage area, and reuse a common existing station
                                                        S100

Determine a first coverage strength of the first network in the
coverage area according to the MR data
                                                        S200

Determine a coverage strength difference between the first
network and the second network in the coverage area
according to the first characteristic information and the
second characteristic information
                                                        S300

Determine a predicted coverage strength of the second
network in the coverage area according to the first coverage
strength and the coverage strength difference
                                                        S400

Fig. 1

Determine rasters of the first network in the coverage area
according to the MR data
                                                        S210

Acquire an MR coverage strength of a cell corresponding to the
rasters
                                                        S220

Determine the first coverage strength of the first network in
the coverage area according to the MR coverage strength
                                                        S230

Fig. 2

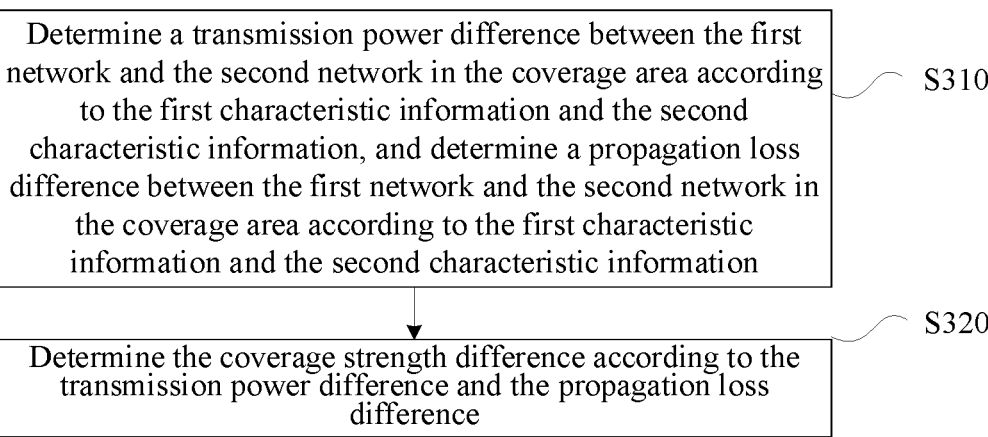

Determine a transmission power difference between the first network and the second network in the coverage area according to the first characteristic information and the second characteristic information, and determine a propagation loss difference between the first network and the second network in the coverage area according to the first characteristic information and the second characteristic information — S310

Determine the coverage strength difference according to the transmission power difference and the propagation loss difference — S320

Fig. 3

Determine the transmission power difference according to the first transmission power parameter and the second transmission power parameter — S311

Fig. 4

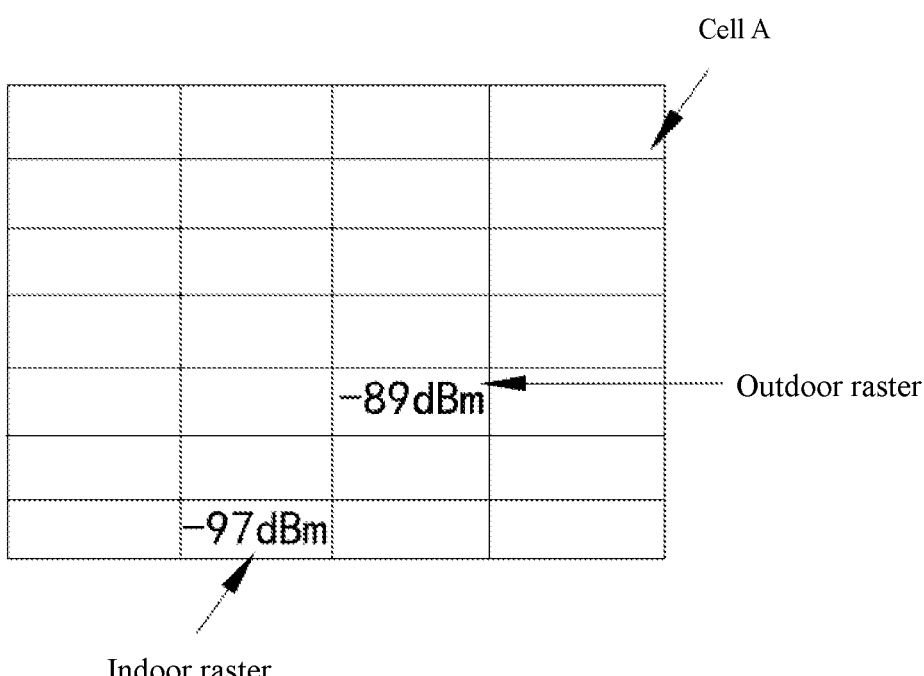

Cell A

−89dBm — Outdoor raster

−97dBm

Indoor raster

Target raster

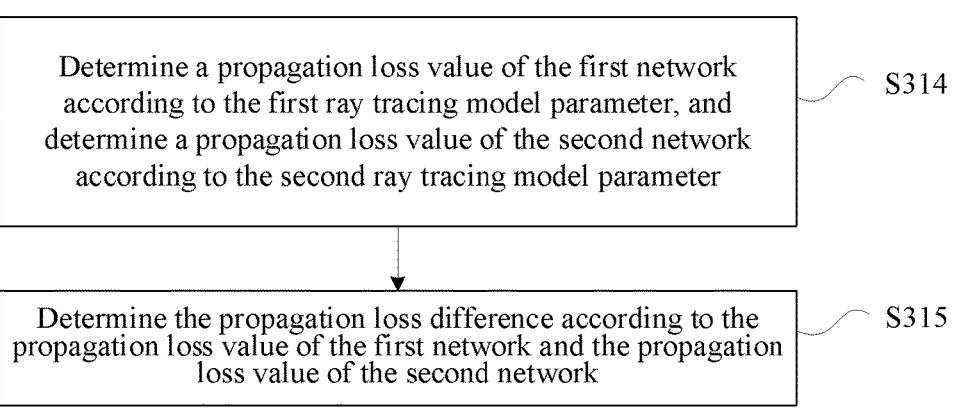

Determine a propagation loss value of the first network according to the first ray tracing model parameter, and determine a propagation loss value of the second network according to the second ray tracing model parameter       S314

Determine the propagation loss difference according to the propagation loss value of the first network and the propagation loss value of the second network       S315

Fig. 10

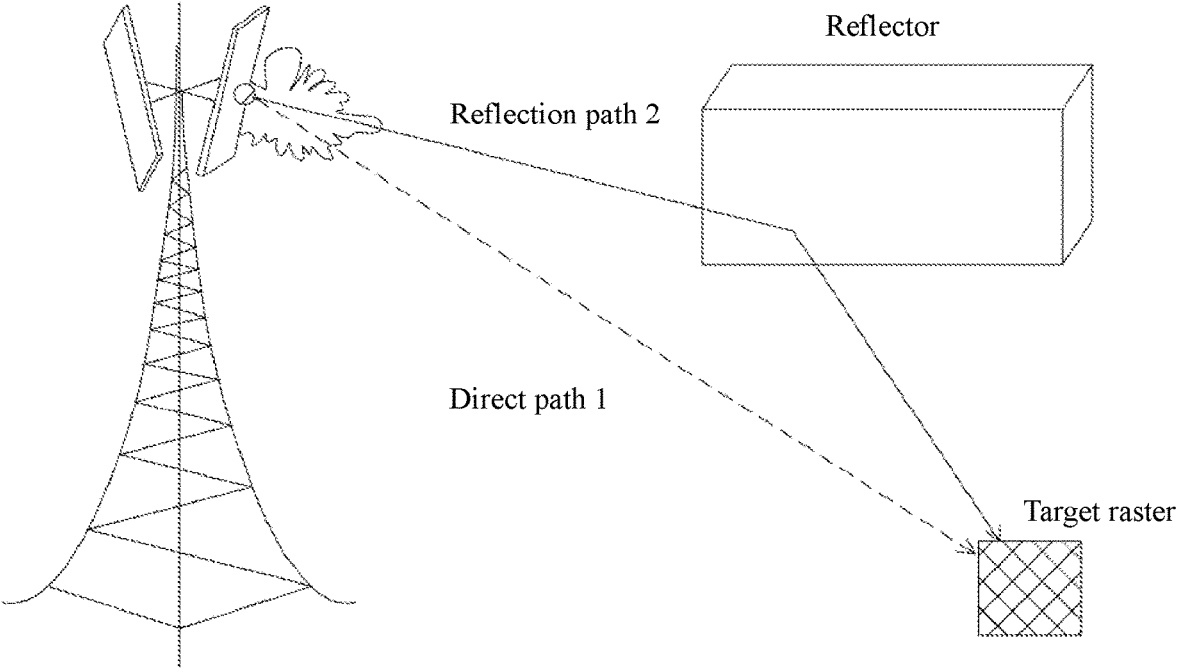

Reflector

Reflection path 2

Direct path 1

Target raster

Fig. 11

Determine the predicted coverage strength of the second network in the coverage area according to the first coverage strength, the transmission power difference, and the propagation loss difference       S410

Fig. 12

NETWORK COVERAGE PREDICTION METHOD AND DEVICE, AND COMPUTER READABLE STORAGE MEDIUM

CROSS-REFERENCE TO RELATED APPLICATION

This application is a national stage filing under 35 U.S.C. § 371 of international application number PCT/CN2021/138456, filed Dec. 15, 2021, which claims priority to Chinese patent application No. 202110287416.6 filed Mar. 17, 2021. The contents of these applications are incorporated herein by reference in their entirety.

TECHNICAL FIELD

Embodiments of the present disclosure relate to, but not limited to, the technical field of communication, and in particular to a network coverage prediction method and devices, and a non-transitory computer-readable storage medium.

BACKGROUND

In station planning for a 5G network, existing 4G network stations are generally used preferentially for 5G network coverage prediction, to evaluate whether a building standard of 5G network stations can be met using the existing 4G network stations. At present, a conventional method for 5G network coverage prediction is to perform coverage prediction on the basis of a propagation model given by simulation software. Although this method can implement 5G network coverage prediction, since calculation is based on a theoretical method, the accuracy of 5G network coverage prediction is low due to the limitation of the propagation model and an electronic map.

SUMMARY

The following is an overview of the subject matter described in detail herein. This summary is not intended to limit the protection scope of the claims.

Embodiments of the present disclosure provide a network coverage prediction method and devices, and a computer-readable storage medium.

In accordance with a first aspect of the present disclosure, an embodiment provides a network coverage prediction method. The method may include: acquiring measure report (MR) data of a first network, first characteristic information corresponding to the first network, and second characteristic information corresponding to a second network, where the first network and the second network have a same coverage area, and the first network and the second network reuse a common existing station; determining a first coverage strength of the first network in the coverage area according to the MR data; determining a coverage strength difference between the first network and the second network in the coverage area according to the first characteristic information and the second characteristic information; and determining a predicted coverage strength of the second network in the coverage area according to the first coverage strength and the coverage strength difference.

In accordance with a second aspect of the present disclosure, an embodiment provides a network coverage prediction device. The device may include: an input module, configured to acquire MR data of a first network, first characteristic information corresponding to the first network, and second characteristic information corresponding to a second network, where the first network and the second network have a same coverage area, and reuse a common existing station; a first data module, configured to determine a first coverage strength of the first network in the coverage area according to the MR data; a second data module, configured to determine a coverage strength difference between the first network and the second network in the coverage area according to the first characteristic information and the second characteristic information; and an output module, configured to determine a predicted coverage strength of the second network in the coverage area according to the first coverage strength and the coverage strength difference.

In accordance with a third aspect of the present disclosure, an embodiment provides a network coverage prediction device. The device may include: a memory, a processor, and a computer program stored in the memory and executable by the processor which, when executed by the processor, causes the processor to implement the network coverage prediction method according to the first aspect.

In accordance with a fourth aspect of the present disclosure, an embodiment provides a non-transitory computer-readable storage medium, storing a computer-executable instruction which, when executed by a processor, causes the processor to implement the network coverage prediction method according to the first aspect.

Other features and advantages of the present disclosure will be set forth in the following description, and will partially become apparent from the description, or may be understood by practicing the present disclosure. The objective and other advantages of the present disclosure can be achieved and acquired by the structure particularly specified in the description, the claims and the accompanying drawings.

BRIEF DESCRIPTION OF DRAWINGS

The accompanying drawings are intended to provide a further understanding of the technical scheme of the present disclosure and constitute part of the description. The accompanying drawings are used together with the embodiments of the present disclosure to illustrate the technical scheme of the present disclosure, and do not constitute a limitation to the technical scheme of the present disclosure.

FIG. 1 is a flowchart of a network coverage prediction method according to an embodiment of the present disclosure;

FIG. 2 is a flowchart of determining a first coverage strength in the network coverage prediction method according to an embodiment of the present disclosure;

FIG. 3 is a flowchart of determining a coverage strength difference in the network coverage prediction method according to an embodiment of the present disclosure;

FIG. 4 is a flowchart of determining a transmission power difference in the network coverage prediction method according to an embodiment of the present disclosure;

FIG. 5 is a schematic diagram of coverage rasters of the first network according to an embodiment of the present disclosure;

FIG. 7(a) is a schematic antenna radiation pattern corresponding to a first network in a horizontal plane direction according to an embodiment of the present disclosure;

FIG. 8(*b*) is a schematic antenna radiation pattern corresponding to the second network in a vertical plane direction according to an embodiment of the present disclosure;

FIG. 10 is a flowchart of determining a propagation loss difference in the network coverage prediction method according to another embodiment of the present disclosure;

FIG. 11 is a schematic propagation diagram of the first network according to another embodiment of the present disclosure;

FIG. 12 is a flowchart of determining a predicted coverage strength in the network coverage prediction method according to an embodiment of the present disclosure;

DETAILED DESCRIPTION

Figure 6:
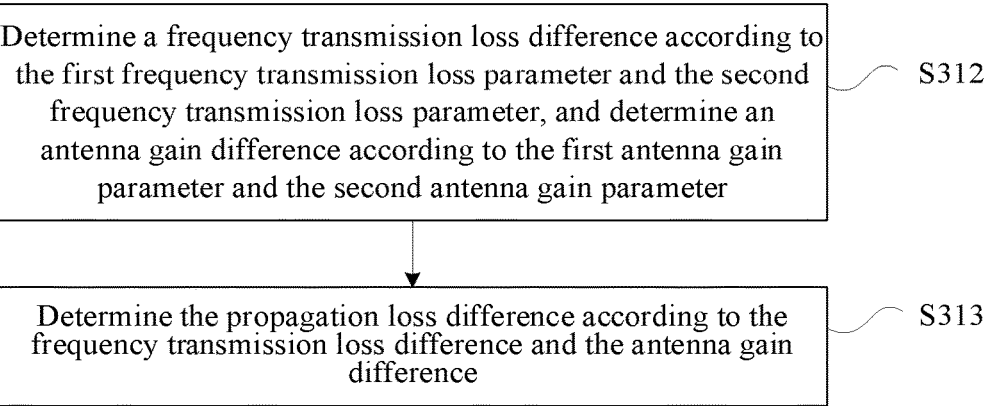
FIG. 6 is a flowchart of determining a propagation loss difference in the network coverage prediction method according to an embodiment of the present disclosure.

In order to make the objective, technical scheme and advantages of the present disclosure clear, the present disclosure will be further described in detail below in conjunction with the accompanying drawings and embodiments. It should be understood that the specific embodiments described herein are merely used to illustrate the present disclosure, and are not intended to limit the present disclosure.

It should be noted that, although functional modules have been divided in the schematic diagram of the apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a network coverage prediction method and devices, and a computer-readable storage medium. In the case where a first network and a second network have the same coverage area and reuse a common existing station, a first coverage strength of the first network in the coverage area can be determined according to acquired MR data of the first network, i.e., a current coverage state of the first network is determined as a basis for coverage prediction of the second network. In the meantime, a coverage strength difference between the two networks in the coverage area can be determined according to acquired first characteristic information corresponding to the first network and acquired second characteristic information corresponding to the second network, i.e., a difference in coverages between the two networks is determined. In this way, the coverage of the second network can be predicted on the basis the acquired first coverage strength and the coverage strength difference. In the process of prediction, calculation based on propagation models of the two networks is not needed, and the coverage prediction of the second network can be realized only by calculating the coverage strength difference between the two networks on the basis of the current coverage state of the first network. Since the calculated coverage strength difference between the two networks is a relative value rather than an absolute value, the dependence requirements and randomness for obtaining the coverage strength difference are greatly reduced, and the error of the calculated coverage strength difference is relatively small, so that the accuracy of the coverage prediction of the second network can be increased.

The embodiments of the present disclosure will be further set forth below in conjunction with the accompanying drawings.

FIG. 1 is a flowchart of a network coverage prediction method according to an embodiment of the present disclosure. As shown in FIG. 1, the method includes, but not limited to, the following steps S100 to S400. Coverage prediction refers to the prediction of final strength of a signal transmitted by a base station received on geographic rasters after transmission by an antenna, propagation, etc.

At S100, MR data of a first network, first characteristic information corresponding to the first network and second characteristic information corresponding to a second network are acquired, where the first network and the second network have the same coverage area, and reuse a common existing station.

In an embodiment, the MR data of the first network is report data sent by a user terminal device in a cell to a base station corresponding to the first network when the user terminal device is connected to the first network. The MR data may be obtained by measuring a service channel where the user terminal device is located, and is used to evaluate a current network status at a location of the user terminal device, such that relevant external factors can implement control, adjustment and other operations on the first network on the basis of the MR data, achieving optimization of the first network. The MR data includes, but not limited to, latitude and longitude information corresponding to the user terminal device, coverage information of a primary serving cell, coverage information of neighbor cells, etc. The MR data may contain different contents in different application scenarios, which is not limited in this embodiment.

In an embodiment, in the case where the first network and the second network reuse the common existing station, coverage prediction of the second network can be performed on the basis of a reusable existing station address of the first network. The first network and the second network may be of, but not limited to, the same type. For example, the first network may be a 4G cell network in a cell, and the second network is a 5G cell network in the corresponding cell. Because the 4G cell network and the 5G cell network have the same coverage area and reuse a common existing station, the coverage prediction of the 5G cell network can be performed on the basis of the reusable existing station address of the 4G cell network. Similarly, when the first network is a 3G cell network, the second network may be a 4G cell network, that is, the coverage prediction of the 4G cell network can also be performed on the basis of a reusable existing station address of the 3G cell network. Alternatively, the types of the first network and the second network may also be set according to actual conditions, which is not limited in this embodiment.

In an embodiment, the coverage area of the first network and the second network may be determined according to, but not limited to, an actual range of each network applied to the cell or according to a configuration parameter corresponding to each network, which is not limited in this embodiment.

In an embodiment, the first characteristic information and the second characteristic information include, but not limited to, application characteristics or parameters of respective network, and may be used to characterize an actual operating state of the network. For example, the characteristic information may include, but not limited to, latitude and longitude parameters, a height-above-average-terrain parameter, an azimuth, a downtilt, an antenna radiation pattern (referring to a graphical representation of a relative field strength of a radiation field changing with the direction at a certain distance from the antenna, which is usually represented by a horizontal plane and a vertical plane in the direction of the maximum radiation of the antenna or directly represented by a 3D graph), a transmission power parameter, planned frequencies, a Ray-tracing Model (which is now widely used in mobile communication and personal communication environments to predict the propagation characteristics of radio waves, and can be used to identify all possible ray paths between reception and transmission in a multipath channel and combined with an antenna radiation pattern and system bandwidth to obtain a coherent synthesis result of all rays at a receiving point), indoor penetration loss, 3D map containing building information, etc. In the following embodiments, some characteristic information and the steps executed based on the characteristic information will be illustrated in detail, which will not be repeated here to avoid redundancy.

At S200, a first coverage strength of the first network in the coverage area is determined according to the MR data.

In an embodiment, the MR data may be used to evaluate the current network status of the user terminal device in the coverage area of the first network, so as to determine the first coverage strength of the first network in the coverage area based on the current network status. Referring to FIG. 2, S200 includes, but not limited to, the following steps S210 to S230.

At S210, rasters of the first network in the coverage area are determined according to the MR data.

At S220, an MR coverage strength of a cell corresponding to the rasters is acquired.

At S230, the first coverage strength of the first network in the coverage area is determined according to the MR coverage strength.

In an embodiment, since the MR data includes, but not limited to, the latitude and longitude information corresponding to the user terminal device, the coverage information of the primary serving cell, the coverage information of the neighbor cells, etc., after being acquired, the MR data of the first network may be located on geographic rasters of the cell, i.e., the rasters of the first network in the coverage area is determined. Meanwhile, since the cell covers the corresponding rasters, after the rasters are determined, the MR coverage strength of the cell for network use on the rasters can be further acquired. Finally, the first coverage strength of the first network in the coverage area can be acquired by acquiring the average MR coverage strength of all cells on coverage rasters. It can be understood that because the MR data serves as an index of cell user perception, the first coverage strength determined based on the MR data can also be used to characterize the coverage of the first network correspondingly. Therefore, taking the first coverage strength as a basis for the coverage prediction of the second network can lead to relatively high accuracy. It should be noted that the first coverage strength may be measured through relevant conditions in practical application. In order to avoid redundancy, values of the first coverage strength are given directly in the examples below for illustration.

In an embodiment, according to the communication type of user terminal devices in the cell, the geographic rasters may be divided into indoor rasters and outdoor rasters. For any raster, it may correspond to only one covered cell or a plurality of covered cells at the same time, which is not limited herein.

At S300, a coverage strength difference between the first network and the second network in the coverage area is determined according to the first characteristic information and the second characteristic information.

In an embodiment, since each characteristic information can be used to characterize the actual operating state of the corresponding network, operating parameters of the corresponding network can be determined according to respective characteristic information, such that the coverage strength difference between the first network and the second network in the coverage area can be determined on the basis of a difference in the operating parameters between the networks. Since a calculated coverage strength difference between the two networks is a relative value rather than an absolute value, the dependence requirements and randomness for obtaining the coverage strength difference are greatly reduced, and the error of the calculated coverage strength difference is relatively small, so that the accuracy of coverage prediction of the second network can be increased. Referring to FIG. 3, S300 includes, but not limited to, the following steps S310 to S320.

At S310, a transmission power difference between the first network and the second network in the coverage area is determined according to the first characteristic information and the second characteristic information, and a propagation loss difference between the first network and the second network in the coverage area is determined according to the first characteristic information and the second characteristic information.

At S320, the coverage strength difference is determined according to the transmission power difference and the propagation loss difference.

In an embodiment, on the one hand, because transmission power refers to the strength of a signal transmitted to a base station by a device (such as a mobile phone, a network card or a walkie-talkie) used by a user, the change of transmission power can reflect the change of network coverage strength, and the coverage strength difference can be predicted on the basis of the transmission power difference between the two networks. On the other hand, since propagation loss will inevitably occur during transmission of the transmitted signal, that is, propagation loss will occur in both the first network and the second network, considering that their respective propagation losses may be different, the coverage of the second network can be more accurately predicted by determining the propagation loss difference between the two networks. It can be understood that by determining the coverage strength difference according to the transmission power difference and the propagation loss difference, the difference in the coverage strengths between the first network and the second network can be accurately and reliably evaluated, which is conducive to increasing the accuracy of coverage prediction of the second network.

In an embodiment, referring to FIG. 4, when the first characteristic information carries a first transmission power parameter of the first network and the second characteristic information carries a second transmission power parameter of the second network, determining a transmission power difference between the first network and the second network in the coverage area according to the first characteristic information and the second characteristic information in S310 further includes a step S311.

At S311, the transmission power difference is determined according to the first transmission power parameter and the second transmission power parameter.

In an embodiment, the transmission power parameters of the first network and the second network can be acquired respectively according to the first characteristic information and the second characteristic information, such that the transmission power difference can be determined by determining the difference between the transmission power parameters of the two networks. For the specific operating principle, reference may be made to the following examples.

Example One

A cell A is given, and a network (i.e., a first network) where the cell A is currently located is a 4G network. Basic configuration parameters of the 4G network carried by the first characteristic information include, but not limited to: a frequency band of 2.1 GHz, a height above average terrain of 32 m, an azimuth of 200°, a downtilt of 4°, and a first transmission power parameter of 16.9 dBm.

Referring to FIG. 5, FIG. 5 shows the coverage of the cell A on each of indoor and outdoor rasters. Each square in the figure represents a raster. It can be seen that the first coverage strength of the indoor raster corresponding to the cell A is −97 dBm, and the first coverage strength of the outdoor raster corresponding to the cell A is −89 dBm. This is because the indoor raster is subjected to penetration loss (i.e., a loss factor caused by penetration from outdoor to indoor) with respect to the outdoor raster, and therefore, the acquired first coverage strengths of the indoor raster and the outdoor raster are different. In fact, in addition to the first coverage strengths of the indoor raster and outdoor raster which will be inevitably affected, the other parameters corresponding to the two rasters will also be affected, which will be illustrated in the following examples.

Example Two

Taking the cell A in Example one as an example for illustration, a target set network (i.e., the second network) of the cell A is a 5G network, and basic configuration parameters of the 5G network carried by the first characteristic information include, but not limited to: a frequency band of 3.5 GHz, and a second transmission power parameter of 17.8 dBm.

Therefore, the difference between the two transmission power parameters can be determined, that is, the transmission power difference is 17.8−16.9=0.9 dBm.

In an embodiment, referring to FIG. 6, when the first characteristic information carries a first frequency transmission loss parameter and a first antenna gain parameter corresponding to the first network and the second characteristic information carries a second frequency transmission loss parameter and a second antenna gain parameter corresponding to the second network, determining a propagation loss difference between the first network and the second network in the coverage area according to the first characteristic information and the second characteristic information in S310 further includes the following steps S312 and S313.

At S312, a frequency transmission loss difference is determined according to the first frequency transmission loss parameter and the second frequency transmission loss parameter, and an antenna gain difference is determined according to the first antenna gain parameter and the second antenna gain parameter.

At S313, the propagation loss difference is determined according to the frequency transmission loss difference and the antenna gain difference.

In an embodiment, the frequency loss of the two networks can be respectively determined by the first frequency transmission loss parameter and the second frequency transmission loss parameter, such that the frequency transmission loss difference between the two networks can be determined by calculating a difference between the two frequency losses. Similarly, the antenna gain of the two networks can be respectively determined by the first antenna gain parameter and the second antenna gain parameter, such that the antenna gain difference between the two networks can be determined by calculating a difference between the two antenna gains. In this way, the propagation loss difference can be accurately and reliably determined by superimposing the frequency transmission loss difference and the antenna gain difference, so as to further increase the accuracy of coverage prediction of the second network.

Example Three

Taking the cell A in Example one and Example two as an example for illustration, the basic configuration parameters of the 4G network carried by the first characteristic information further include, but not limited to, a transmission loss parameter corresponding to f1 (f1 is a frequency in the 4G network) of 2.1; and the basic configuration parameters of the 5G network carried by the second characteristic information further include, but not limited to, a transmission loss parameter corresponding to f2 (f2 is a frequency in the 5G network) of 3.5. Then the frequency transmission loss difference of the outdoor raster is 28 log (3.5/2.1)=6.2 dB. Considering the influence of the indoor penetration loss of the 4G network/5G network, which in this embodiment is 5 dB, the frequency transmission loss difference of the indoor raster is 6.2+5=11.2 dB.

Figure 7:
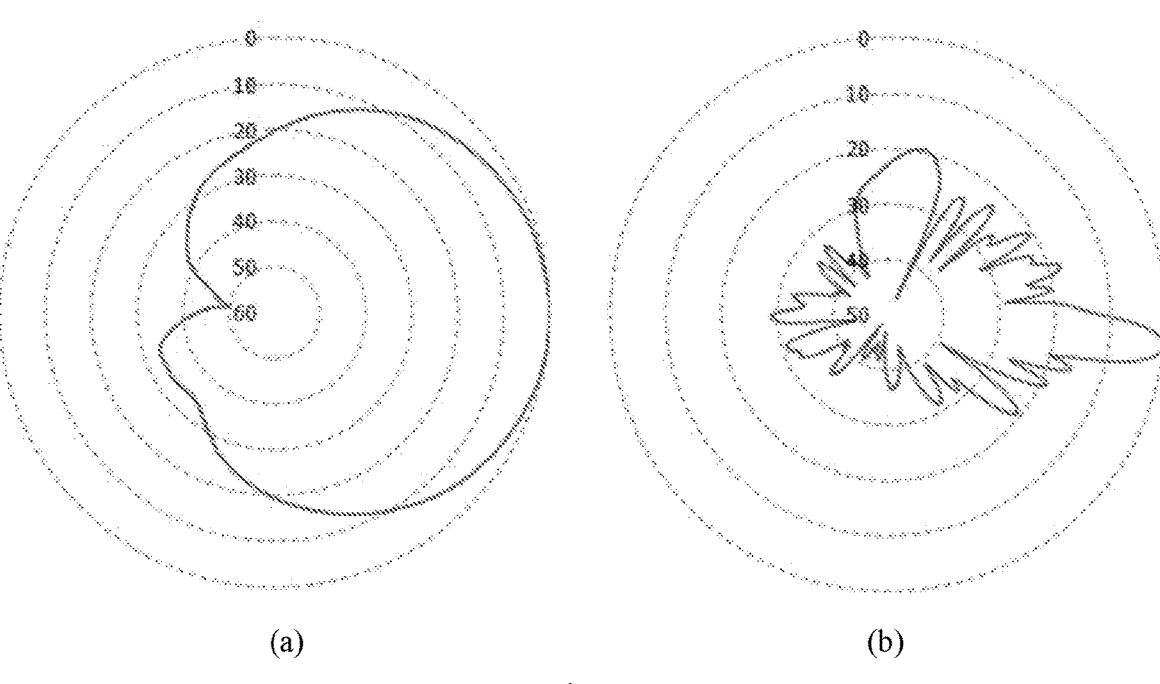
FIG. 7(*b*) is a schematic antenna radiation pattern corresponding to the first network in a vertical plane direction according to an embodiment of the present disclosure.
Figure 8:
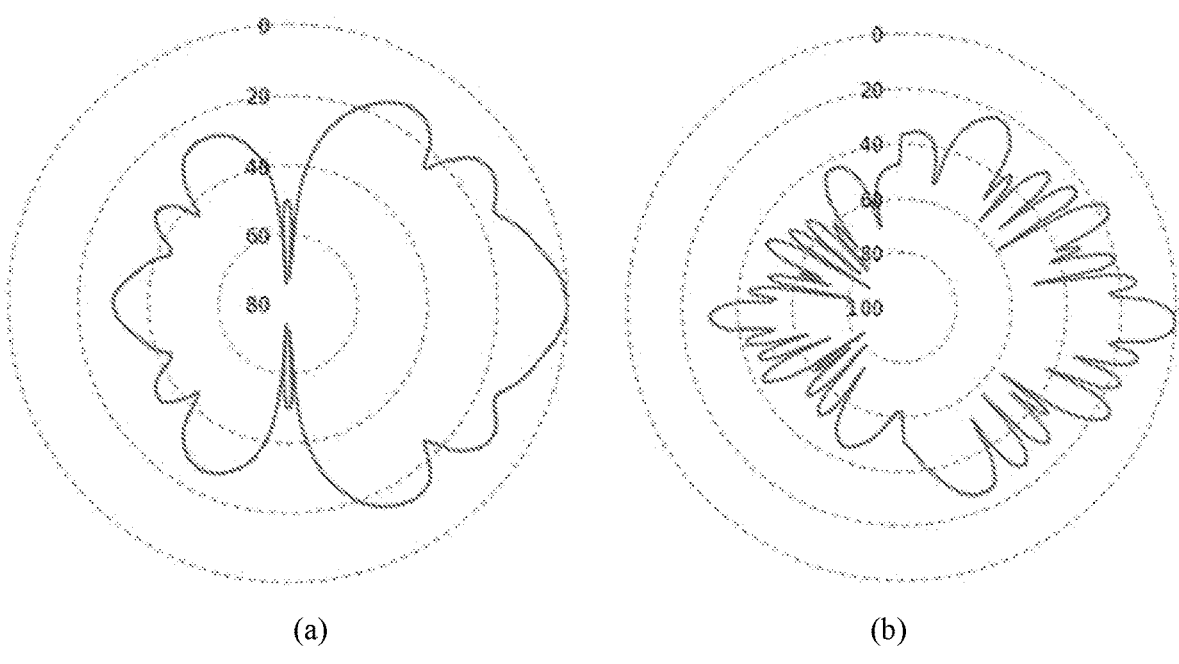
FIG. 8(*a*) is a schematic antenna radiation pattern corresponding to a second network in a horizontal plane direction according to an embodiment of the present disclosure.
Figure 9:
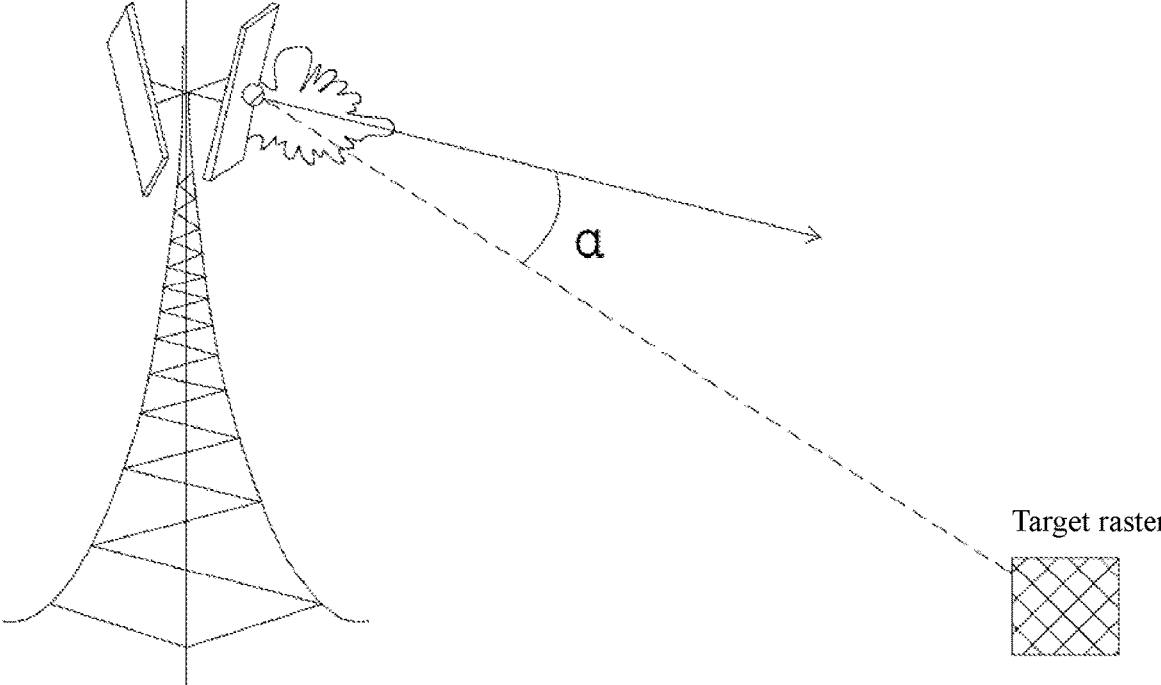
FIG. 9 is a schematic propagation diagram of the first network according to an embodiment of the present disclosure.

Referring to FIG. 7 and FIG. 8, FIG. 7 shows antenna radiation patterns of the 4G network carried in the first characteristic information, and FIG. 8 shows antenna radiation patterns of the 5G network carried in the second characteristic information. FIG. 7(a) and FIG. 8(a) depict the antenna radiation patterns of the corresponding networks on a horizontal plane respectively, and FIG. 7(b) and FIG. 8(b) depict the antenna radiation patterns of the corresponding networks on a vertical plane respectively. Moreover, referring to a schematic diagram of the calculation of the antenna gain of the 4G network shown in FIG. 9, based on an angle α of a connecting line between a target raster and an antenna and according to the antenna radiation patterns shown in FIG. 7 and FIG. 8, the antenna gain of the 4G network is acquired in consideration of the respective influences on each network in the horizontal and vertical directions. Similarly, the antenna gain of the 5G network can be acquired, to calculate an antenna gain difference corresponding to the target raster. If the target raster is an outdoor raster, the antenna gain difference is −10.7 dB, and if the target raster is an indoor raster, the antenna gain difference is −5 dB.

In an embodiment, referring to FIG. 10, when the first characteristic information carries a first ray tracing model parameter corresponding to the first network and the second characteristic information carries second a ray tracing model parameter corresponding to the second network, determining a propagation loss difference between the first network and the second network in the coverage area according to the first characteristic information and the second characteristic information in S310 further includes the following steps S314 and S315.

At S314, a propagation loss value of the first network is determined according to the first ray tracing model parameter, and a propagation loss value of the second network is determined according to the second ray tracing model parameter.

At S315, the propagation loss difference is determined according to the propagation loss value of the first network and the propagation loss value of the second network.

In an embodiment, the propagation loss value of each network can be directly determined according to respective ray tracing model parameter, so that the propagation loss difference between the first network and the second network can be accurately and reliably determined on the basis of the difference between the obtained propagation loss values of the two networks, thereby further increasing the accuracy of coverage prediction of the second network.

Example Four

Taking the cell Ain Example one to Example three as an example for illustration, referring to a schematic diagram of the calculation of the antenna gain of the 4G network shown in FIG. 11, the antenna radiation pattern of the 4G network is introduced with a target raster being an outdoor raster as an example, and the propagation losses of all paths are calculated with results of a ray tracing model. As shown in FIG. 11, there are two rays (propagation paths) between the antenna and the target raster, one is a ray that directly hits the target raster (i.e., a direct path 1 in FIG. 11) and the other is a ray that is reflected by a reflector onto the target raster (i.e., a reflection path 2 in FIG. 11). Then, antenna gains obtained by the two rays on the 4G antenna radiation pattern are calculated, and a propagation loss value corresponding to the 4G network is obtained at the position of the target raster according to the acquired antenna gains. Similarly, a propagation loss value corresponding to the 5G network can be acquired by this method. In this way, an antenna gain difference corresponding to the target raster is calculated as −18 dB, and if the target raster is an indoor raster, the antenna gain difference is −16.9 dB.

It can be understood that according to the above examples, when the propagation loss difference is determined according to the frequency transmission loss difference and the antenna gain difference, only one path is required for calculation of the influence of antenna gain, while when the ray tracing model parameter is used for calculation, all possible propagation paths from the antenna to the target raster need to be considered. Therefore, the calculation burden of the method in Example four may be greater than in Example three, but the error of the propagation loss difference acquired based on the method in Example four may be smaller. Those having ordinary skills in the art can choose the method for calculation according to actual situations, which is not limited herein.

At S400, a predicted coverage strength of the second network in the coverage area is determined according to the first coverage strength and the coverage strength difference.

In an embodiment, the coverage of the second network is predicted on the basis of the acquired first coverage strength and the coverage strength difference. It can be understood that in the process of prediction, calculation based on propagation models of the two networks is not needed, and the coverage prediction of the second network can be realized only by calculating the coverage strength difference between the two networks on the basis of the current coverage state of the first network. Since the calculated coverage strength difference between the two networks is a relative value rather than an absolute value, the dependence requirements and randomness for obtaining the coverage strength difference are greatly reduced, and the error of the calculated coverage strength difference is relatively small, so that the accuracy of coverage prediction of the second network can be increased.

Moreover, referring to FIG. 12, S400 further includes, but not limited to, a following step S410.

At S410, the predicted coverage strength of the second network in the coverage area is determined according to the first coverage strength, the transmission power difference, and the propagation loss difference.

In an embodiment, since the change of transmission power can reflect the change of network coverage strength and the change of propagation loss can reflect the actual influence on the coverages of the networks, considering the above influences, the predicted coverage strength of the second network in the coverage area is determined according to the acquired first coverage strength, transmission power difference and propagation loss difference, such that the influence on prediction caused by the change of transmission power, propagation loss and on the like can be reduced, thus increasing the accuracy of coverage prediction of the second network.

Example Five

Based on the method in Example three, the predicted coverage strengths of the outdoor raster and the indoor raster can be respectively calculated as:

$$-89+0.9-6.2-10.7=-105 \text{ dBm, and } -97+0.9-11.2-5=-112.3 \text{ dBm.}$$

Based on the method in Example four, the predicted coverage strength of the outdoor raster can be calculated as −89+0.9−18=−106.1 dBm, and the predicted coverage strength of the indoor raster can be calculated as −97+0.9−16.9=−113 dBm.

Figure 13:
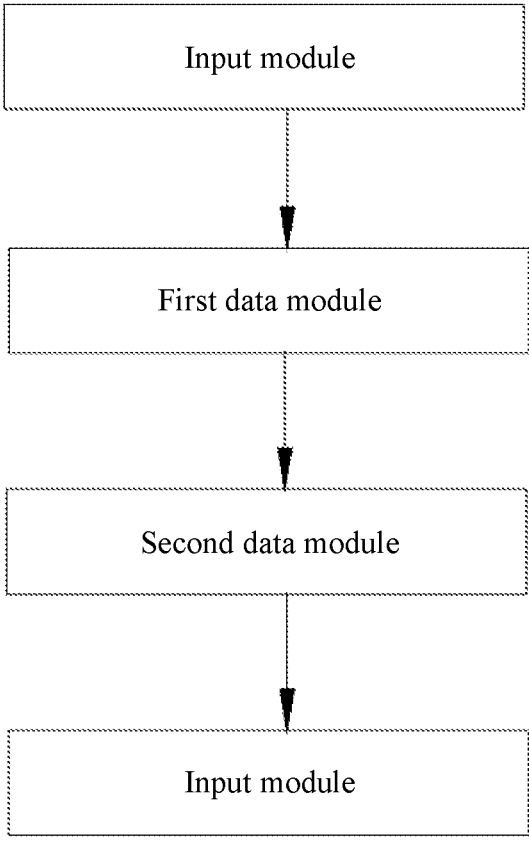
FIG. 13 is a schematic diagram of a network coverage prediction device according to an embodiment of the present disclosure.

In addition, referring to FIG. 13, an embodiment of the present disclosure provides a network coverage prediction device. The device includes: an input module, an input module, a second data module, and an output module.

The input module is configured to acquire MR data of a first network, first characteristic information corresponding to the first network, and second characteristic information corresponding to a second network, where the first network and the second network have the same coverage area, and reuse a common existing station.

The first data module is configured to determine a first coverage strength of the first network in the coverage area according to the MR data.

The second data module is configured to determine a coverage strength difference between the first network and the second network in the coverage area according to the first characteristic information and the second characteristic information.

The output module is configured to determine a predicted coverage strength of the second network in the coverage area according to the first coverage strength and the coverage strength difference.

In an embodiment, in the case where the first network and the second network have the same coverage area and reuse the common existing station, the MR data, the first characteristic information and the second characteristic information are acquired by the input module, and the first coverage strength of the first network in the coverage area is determined by the first data module, i.e., the current coverage state of the first network is determined as a basis for the coverage prediction of the second network. In the meantime, the coverage strength difference between the two networks in the coverage area is determined by the second data module on the basis of the first characteristic information and the second characteristic information, i.e., the difference in coverages between the two networks is determined. In this way, the coverage of the second network can be predicted by the output module on the basis the acquired first coverage strength and the coverage strength difference. In the process of prediction, calculation based on propagation models of the two networks is not needed, and the coverage prediction of the second network can be realized only by the second data module calculating the coverage strength difference between the two networks on the basis of the current coverage state of the first network. Since the calculated coverage strength difference between the two networks is a relative value rather than an absolute value, the dependence requirements and randomness for obtaining the coverage strength difference are greatly reduced, and the error of the calculated coverage strength difference is relatively small, so that the accuracy of coverage prediction of the second network can be increased.

Figure 14:
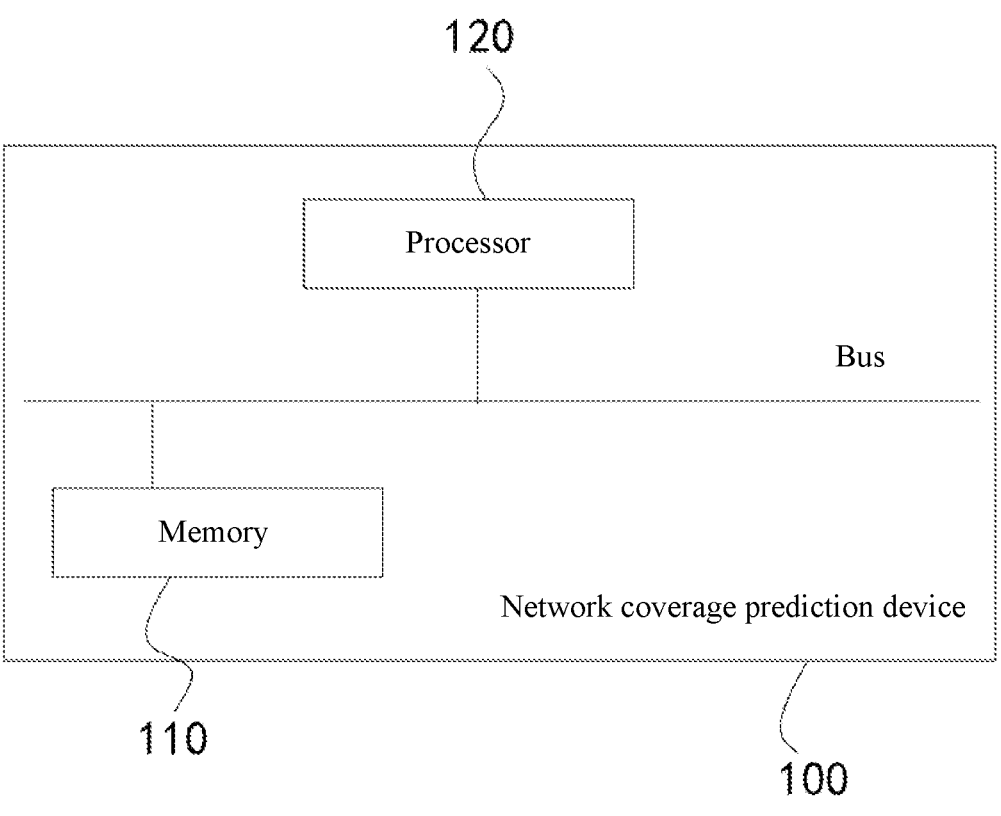
FIG. 14 is a schematic diagram of a network coverage prediction device according to another embodiment of the present disclosure.

In addition, referring to FIG. 14, an embodiment of the present disclosure further provides a network coverage prediction device 100, which includes a memory 110, a processor 120, and a computer program stored in the memory 110 and executable by the processor 120.

The processor 120 and the memory 110 may be connected through a bus or in other ways.

A non-transient software program and instructions required to implement the network coverage prediction method of the above embodiments are stored in the memory 110 which, when executed by the processor 120, cause the processor 120 to implement the network coverage prediction method of the above embodiments, e.g. implement the steps S100 to S400 in FIG. 1, steps S210 to S230 in FIG. 2, steps S310 and S320 in FIG. 3, step S311 in FIG. 4, steps S312 and S313 in FIG. 6, steps S314 and S315 in FIG. 10 or step S410 in FIG. 12 described above.

The embodiment of the device described above is merely illustrative, and the units described as separate components may or may not be physically separated, that is, the units may be located in one place or distributed on a plurality of network units. Some or all of the modules may be selected according to actual needs to achieve the objective of the scheme of this embodiment.

In addition, an embodiment of the present disclosure provides a non-transitory computer-readable storage medium, storing a computer-executable instruction which, when executed by a processor 120 or a controller, e.g. the processor 120 in the above embodiment of the device, causes the processor 120 to implement the network coverage prediction method in the above embodiments, e.g. implement steps S100 to S400 in FIG. 1, steps S210 to S230 in FIG. 2, steps S310 and S320 in FIG. 3, step S311 in FIG. 4, steps S312 and S313 in FIG. 6, steps S314 and S315 in FIG. 10 or step S410 in FIG. 12 described above.

An embodiment of the present disclosure includes: acquiring MR data of a first network, first characteristic information corresponding to the first network, and second characteristic information corresponding to a second network, where the first network and the second network have the same coverage area, and reuse a common existing station; determining a first coverage strength of the first network in the coverage area according to the MR data; determining a coverage strength difference between the first network and the second network in the coverage area according to the first characteristic information and the second characteristic information; and determining a predicted coverage strength of the second network in the coverage area according to the first coverage strength and the coverage strength difference. According to the scheme provided by an embodiment of the present disclosure, in the case where the first network and the second network have the same coverage area and reuse the common existing station, the first coverage strength of the first network in the coverage area can be determined according to the acquired MR data of the first network, i.e., the current coverage state of the first network is determined as a basis for coverage prediction of the second network. In the meantime, the coverage strength difference between the two networks in the coverage area can be determined according to acquired first characteristic information corresponding to the first network and acquired second characteristic information corresponding to the second network, i.e., the difference in coverages between the two networks is determined. In this way, the coverage of the second network can be predicted on the basis the acquired first coverage strength and the coverage strength difference. In the process of prediction, calculation based on propagation models of the networks is not needed, and the coverage prediction of the second network can be realized only by calculating the coverage strength difference between the two networks on the basis of the current coverage state of the first network. Since the calculated coverage strength difference between the two networks is a relative value rather than an absolute value, the dependence requirements and randomness for obtaining the coverage strength difference are greatly reduced, and the error of the calculated coverage strength difference is relatively small, so that the accuracy of coverage prediction of the second network can be increased.

It can be understood by those having ordinary skills in the art that all or some of the steps in the method and the system disclosed above can be implemented as software, firmware, hardware and an appropriate combination thereof. Some or all of the physical components may be implemented as software executed by a processor (such as a central processing unit, a digital signal processor, or a microprocessor), hardware or an integrated circuit (such as an Application-Specific Integrated Circuit). Such software may be distributed on computer-readable media, which may include computer storage media (or non-transitory media) and communication media (or transitory media). As is well-known to those having ordinary skills in the art, the term "computer storage media" include volatile and nonvolatile, removable and non-removable media implemented in any method or technology for storing information (such as computer-readable instructions, data structures, program modules or other data). Computer storage media include, but not limited to, RAM, ROM, EEPROM, flash memory or other memory technologies, CD-ROM, Digital Versatile Disk (DVD) or other optical disk storage, magnetic cassettes, magnetic tapes, magnetic disk storage or other magnetic storage devices or any other media that can be used to store desired information and can be accessed by computers. Furthermore, it is well-known to those having ordinary skills in the art that communication media typically contain computer-readable instructions, data structures, program modules or other data in a modulated data signal such as carriers or other transmission mechanisms, and may include any information delivery media.

Some embodiments of the present disclosure have been described in detail above, but the present disclosure is not limited to the above embodiments. Those having ordinary skills in the art can also make various equivalent modifications or replacements without departing from the scope of the present disclosure, and these equivalent modifications or replacements shall be included in the scope defined by the claims of the present disclosure.

The invention claimed is:

1. A network coverage prediction method, comprising:
acquiring Measure Report (MR) data of a first network, first characteristic information corresponding to the first network, and second characteristic information corresponding to a second network, wherein the first network and the second network have a same coverage area, and are reusable and co-sited, the first characteristic information carries a first frequency transmission loss parameter and a first antenna gain parameter corresponding to the first network, the first antenna gain parameter is calculated based on a first antenna radiation pattern and a raster, the second characteristic information carries a second frequency transmission loss parameter and a second antenna gain parameter corresponding to the second network, and the second antenna gain parameter is calculated based on a second antenna radiation pattern and the raster;
determining a first coverage strength of the first network in the coverage area according to the MR data;
determining a transmission power difference between the first network and the second network in the coverage area according to the first characteristic information and the second characteristic information;
determining a frequency transmission loss difference according to the first frequency transmission loss parameter and the second frequency transmission loss parameter;
determining an antenna gain difference according to the first antenna gain parameter and the second antenna gain parameter;
determining the propagation loss difference according to the frequency transmission loss difference and the antenna gain difference;
determining a coverage strength difference between the first network and the second network in the coverage area according to the transmission power difference and the propagation loss difference; and
determining a predicted coverage strength of the second network in the coverage area according to the first coverage strength and the coverage strength difference.

2. The network coverage prediction method of claim 1, wherein the first characteristic information further carries a first transmission power parameter of the first network, and the second characteristic information further carries a second transmission power parameter of the second network; and
determining a transmission power difference between the first network and the second network in the coverage area according to the first characteristic information and the second characteristic information comprises:
determining the transmission power difference according to the first transmission power parameter and the second transmission power parameter.

3. The network coverage prediction method of claim 1, wherein determining a predicted coverage strength of the second network in the coverage area according to the first coverage strength and the coverage strength difference comprises:
determining the predicted coverage strength of the second network in the coverage area according to the first coverage strength, the transmission power difference, and the propagation loss difference.

4. The network coverage prediction method of claim 1, wherein determining a first coverage strength of the first network in the coverage area according to the MR data comprises:
determining rasters of the first network in the coverage area according to the MR data;
acquiring an MR coverage strength of a cell corresponding to the rasters; and
determining the first coverage strength of the first network in the coverage area according to the MR coverage strength.

5. The network coverage prediction method of claim 2, wherein determining a predicted coverage strength of the second network in the coverage area according to the first coverage strength and the coverage strength difference comprises:
determining the predicted coverage strength of the second network in the coverage area according to the first coverage strength, the transmission power difference, and the propagation loss difference.

6. A non-transitory computer-readable storage medium, storing a computer-executable instruction which, when executed by a processor, causes the processor to perform the network coverage prediction method of claim 1.

7. A network coverage prediction device, comprising:
an input module, configured to acquire Measure Report (MR) data of a first network, first characteristic information corresponding to the first network, and second characteristic information corresponding to a second network, wherein the first network and the second network have a same coverage area, and reuse a common existing station, the first characteristic information carries a first frequency transmission loss parameter and a first antenna gain parameter corresponding to the first network, the first antenna gain parameter is calculated based on a first antenna radiation pattern and a raster, the second characteristic information carries a second frequency transmission loss parameter and a second antenna gain parameter corresponding to the second network, and the second antenna gain parameter is calculated based on a second antenna radiation pattern and the raster;
a first data module, configured to determine a first coverage strength of the first network in the coverage area according to the MR data;
a second data module, configured to determine a transmission power difference between the first network and the second network in the coverage area according to the first characteristic information and the second characteristic information, determine a frequency transmission loss difference according to the first frequency transmission loss parameter and the second frequency transmission loss parameter, determine an antenna gain difference according to the first antenna gain parameter and the second antenna gain parameter, determine the propagation loss difference according to the frequency transmission loss difference and the antenna gain difference, and determine a coverage strength difference between the first network and the second network in the coverage area according to the transmission power difference and the propagation loss difference; and an output module, configured to determine a predicted coverage strength of the second network in the coverage area according to the first coverage strength and the coverage strength difference.

8. A network coverage prediction device, comprising a memory, a processor, and a computer program stored in the memory and executable by the processor which, when executed by the processor, causes the processor to perform a network coverage prediction method comprising:

acquiring Measure Report (MR) data of a first network, first characteristic information corresponding to the first network, and second characteristic information corresponding to a second network, wherein the first network and the second network have a same coverage area, and are reusable and co-sited, the first characteristic information carries a first frequency transmission loss parameter and a first antenna gain parameter corresponding to the first network, the first antenna gain parameter is calculated based on a first antenna radiation pattern and a raster, the second characteristic information carries a second frequency transmission loss parameter and a second antenna gain parameter corresponding to the second network, and the second antenna gain parameter is calculated based on a second antenna radiation pattern and the raster;

determining a first coverage strength of the first network in the coverage area according to the MR data;

determining a transmission power difference between the first network and the second network in the coverage area according to the first characteristic information and the second characteristic information;

determining a frequency transmission loss difference according to the first frequency transmission loss parameter and the second frequency transmission loss parameter;

determining an antenna gain difference according to the first antenna gain parameter and the second antenna gain parameter;

determining the propagation loss difference according to the frequency transmission loss difference and the antenna gain difference;

determining a coverage strength difference between the first network and the second network in the coverage area according to the transmission power difference and the propagation loss difference; and determining a predicted coverage strength of the second network in the coverage area according to the first coverage strength and the coverage strength difference.

* * * * *